Patented Aug. 7, 1945

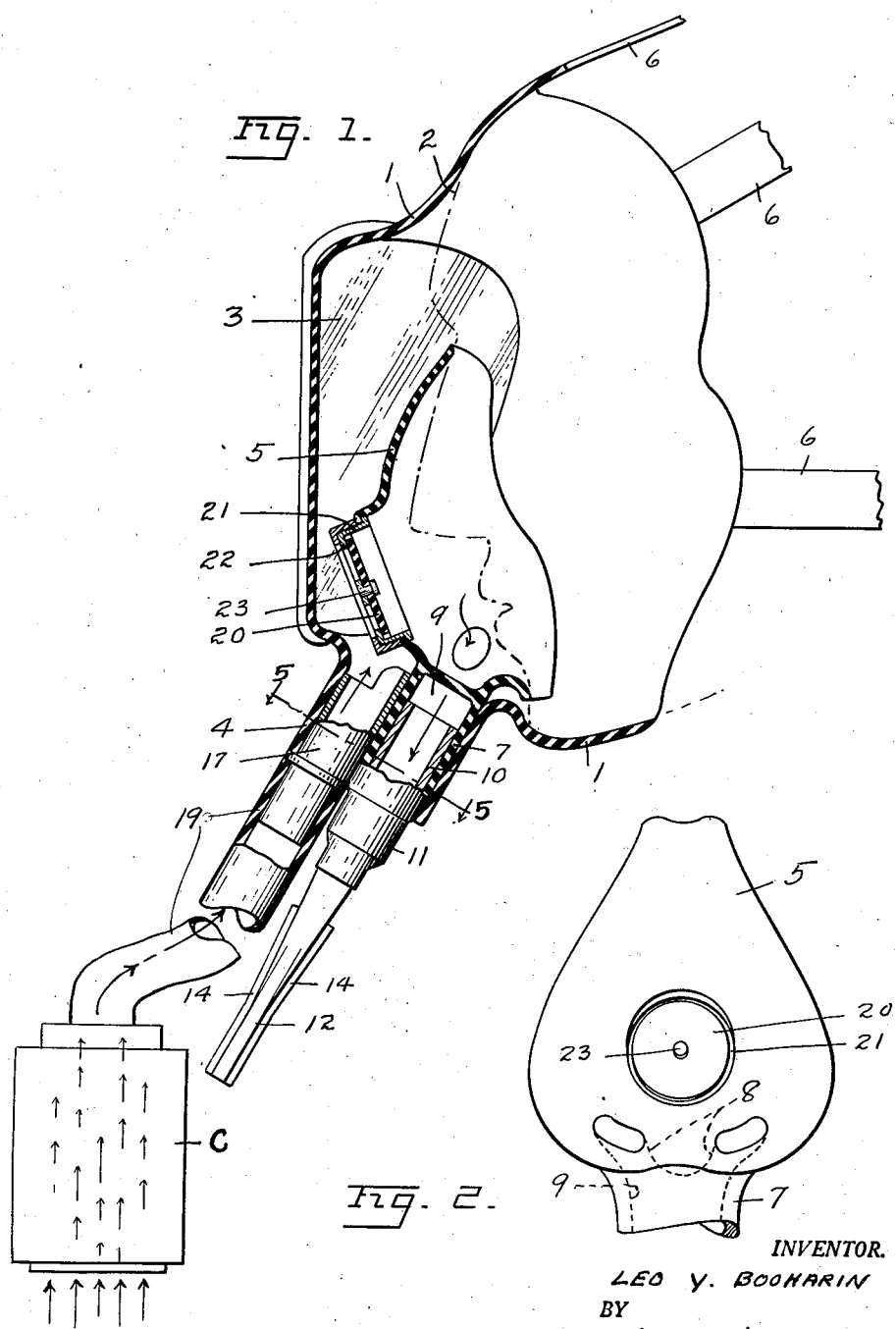

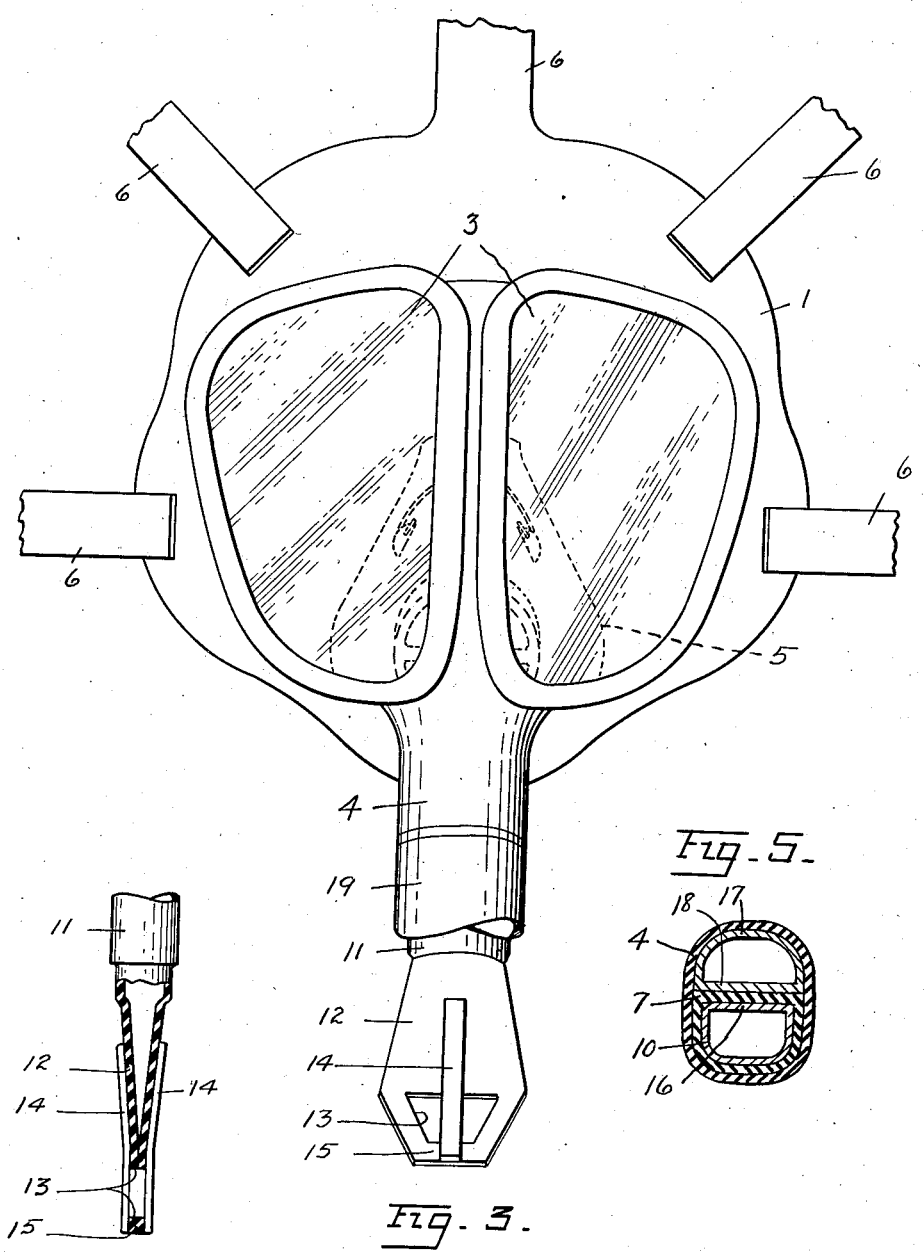

2,381,568

UNITED STATES PATENT OFFICE 2,381,568

GAS MASK

Leo Y. Booharin, San Francisco, Calif., assignor of one-half to Mark Cooney, San Francisco, Calif.

Application October 19, 1942, Serial No. 462,493

4 Claims. (Cl. 128—141)

This invention relates to gas and dust masks and has for one of its objects the provision of a gas mask so constructed as to eliminate fogging of the eye lenses of the mask under those conditions in which such fogging would occur in a conventional mask of the goggle type or of the type having eye lenses when such mask is being used.

Another object of this invention is gas mask construction having the inlet and outlet for air so formed and arranged as to insure easy breathing by the wearer free from fogging of the eye lenses and which inlet and outlet are substantially noiseless in operation, the former due to its position and the latter due to its construction.

A still further object of this invention is gas mask construction of the type having eye lenses that is more simple and more economical to make and to disassemble for replacement or repairs of any elements thereof than heretofore, and which mask is so constructed as to insure elimination of fogging of the lenses by moisture condensed from the air.

Other objects and advantages will appear in the specification and drawings.

In the drawings,

Fig. 1 is a vertical sectional view through the facepieces of the mask, and in which view part of the exhaust valve and part of the intake coupling are shown in elevation. The face of a wearer is indicated in dot-dash line in its relation to the air inlet and exhaust passageways when the mask is being worn.

Fig. 2 is a view of the nose and mouth covering facepiece of the mask looking toward the inside of said portion.

Fig. 3 is a front elevational view of the outer facepiece of the mask including the exhaust valve.

Fig. 4 is a part sectional, part elevational view of the exhaust valve.

Fig. 5 is a sectional view taken along line 5—5 of Fig. 1.

In detail, the mask illustrated in the drawings comprises a main or outer facepiece 1 of flexible rubber or the like, molded or formed in generally concave form to fit over the face 2 of a wearer in a manner so that the marginal portions therein of will relatively tightly fit against the forehead, sides of face, forwardly of the ears, and under the chin, completely sealing the space between the generally central area of the main facepiece and the face against ingress of gas, air, dust and the like, past said marginal portions to within said space.

The outer facepiece is preferably formed with relatively large openings over the eyes of the wearer in which are fitted lenses 3. These openings and lenses may extend from the brows of the face to points well below the eyes, as best seen in Fig. 3, so as to permit relatively wide visibility without the necessity of the wearer's lowering or turning the head to see objects through the lenses that would be within the range of visibility of the eyes upon turning the latter when the mask is not used.

The lower part of the outer facepiece 1 is formed with a downwardly and forwardly projecting tube 4, the inner open end of which is positioned to be below the nose and mouth of a wearer. This tube is preferably molded integrally with the said outer facepiece.

Within the concave side of the outer facepiece 1 is an inner nose and mouth covering facepiece 5 of generally concave form having edges and marginal portions adjacent thereto adapted to follow the contour of the wearer's face along a line extending across the bridge of the nose, down the cheek and across the forward surface of the chin, and to make sealing contact with the face along such line simultaneously with the sealing contact made by the marginal portions of the outer facepiece 1 when the mask is secured over the face by conventional straps 6. These straps may extend around the head in the usual manner and are provided with buckles (not shown) for adjusting the same to the head.

The inner facepiece 5 is preferably of relatively soft rubber having sufficient thickness to hold its shape, but sufficient resiliency along the marginal portions to follow the surface of the face in sealing engagement therewith.

The lower portion of inner facepiece 5 at about the level of the mouth of the wearer when the mask is in face-covering position, is provided with a tube 7 projecting downwardly into the tube 4 of the outer facepiece and the passageway in the said tube divides at its end adjacent the main wall of inner facepiece 5 to form two passageways 8 (Fig. 2) respectively opening at one of their ends into the concave side of inner facepiece 5, at points substantially below the nostrils of the face of the wearer and below the level of the latter's mouth. The opposite ends of passageways open into the single passageway 9 in tube 7, and the outer end of said passageway is open for securement of the exhaust valve therein. While the division of passageway 9 into passageways 8 is preferable to facilitate the exhaustion of air within member 5 upon exhalation of air by the wearer, it is not absolutely essential, and in cheaper masks the passageway 9 may open directly into the inner face piece 5 at its inner end.

The preferred exhaust valve structure includes a tubular, open-ended sleeve 10 of rigid material, one end portion of which is tightly embraced in tube 7 to form a leak-proof seal between the outer sides of said sleeve and the inner sides of the tube. The opposite end portion of sleeve 10 projects from the outer end of tube 7 and is tightly embraced by the tubular neck part 11 of the exhaust valve.

The exhaust valve functions like a check valve, permitting the air exhaled from the lungs of the wearer to pass outwardly of the mask but automatically closing when the wearer inhales.

Outwardly of sleeve 10 and neck 11 the resilient walls of the exhaust valve are flattened as at 12 (Fig. 3) and come together (Fig. 4) and are securely connected together at their side edges and at their end edges remote from the tubular neck 11. The flat walls 12 of the valve are formed with registering openings 13, and reinforcing strips 14 of resilient rubber, or the like, secured to or formed integrally with the valve walls are secured to or formed integrally with the valve walls, and extend transversely and centrally across the openings 13 toward neck 11. These strips are secured at their outer ends to the connected end portions 14 (Fig. 4) of sides 12.

The strips 14 function to substantially eliminate the noise that occurs during actuation of the valve when the mask is being used, and provides a quicker acting valve than where the strips are not used. Also the valve is suitable for use under water as well as in the open air, due to its quick and positive closing, since the strips 14 yieldably urge the flattened walls 12 of the valve into light but sealing engagement with each other if the wearer neither inhales nor exhales for a limited period of time.

The sleeve 10 is formed with a flat side 16 (Fig. 5) and the wall of tube 7 extending over this side 16 is correspondingly flattened when the end of the sleeve is in the tube 7.

Alongside the flattened side 16 of sleeve 10 is a second open-ended sleeve 17 of rigid material having a flat side 18 (Fig. 5) adapted to substantially cover the flattened portion of tube 7 that extends over the flat side 16 of sleeve 10.

One end of sleeve 17 and the end portion of sleeve 10 that is enclosed in tube 7 are adapted to be tightly held in the projecting tubular portion 4 of the outer facepiece with an air sealing contact between the inner sides of tubular portion 4 and the exposed outer surfaces of the said end of sleeve 17 and the tube 7.

The opposite end portion of sleeve 17 projects outwardly of the tubular portion 4 and is tightly held in one end of rubber tube 19 that extends to any conventional chemical or filter cartridge or can C (Fig. 1) in which the contaminated air inhaled is purified before reaching the wearer.

While the sleeve 10 may be cemented in tube 7, and the tube 7 and sleeve 17 may be cemented together and cemented in the tubular portion 4 of the outer facepiece after assembly or during the assembly, it is preferable that the sealing of the elements together be accomplished by the inherent resiliency of the rubber or rubber-like tube 7 and tube 4, these being of sufficient thickness and resiliency to hold the assembly together in sealing relation, but separable upon forcible stretching of the tubes 7, 4.

From the foregoing explanation, it is seen that the inner, open ends of the sleeves 10, 17 communicate with the concave sides of inner facepiece 5 and the outer facepiece 1 of the mask respectively.

The inner, open end of sleeve 17 is spaced from the convex side of inner facepiece 5 just below a conventional valve 20 that is of the floating disk type, thus said inner, open end communicates with the entire space, the walls or sides of which are defined by the face of the wearer outwardly of member 5, and the concave side of the outer facepiece of the mask including the lenses 3.

The valve 20 is a thin, flexible, circular disk, preferably of rubber, supported coaxially in a cylindrical member 21 that is secured tightly in a circular opening in the inner facepiece 5 at a level slightly below the nose of the wearer when the mask is in operative position. The marginal portion of disk 20 is adapted to seal against an annular, inwardly projecting flange 22 on member 21 when the wearer exhales, thus forcing the exhaled air out of the exhaust valve in tube 7. Upon the wearer's inhaling, the valve 20 moves axially away from flange 22 on a central pin 23 that is carried on spider arms extending radially inwardly from the flange 22. This valve, in itself, is of the conventional form.

The manufacture and assembly of the mask are simple operations, since the rubber or composition material of the outer facepiece (exclusive of lenses) may be molded at one time, including the tubular portion 4.

The inner facepiece 5 likewise may be molded at one time insofar as the rubber or rubber-like portions thereof are concerned, and then the sleeves 10 may be inserted in the tubular portion 7 of the member 5 and the exhaust valve secured on the projecting end of sleeve 10. After this the sleeve 17 may be placed alongside and parallel with the sleeve 10, as seen in Fig. 1, and inserted in the tubular portion 4 of the main body member 1, thus supporting the member 5 in proper position in the body portion 1 and securing the two together. The tube 19 leading to the chemical or filter cartridge is then connected to sleeve 17 and the mask is ready for use, it being understood that the valve assembly supporting valve 20 is already assembled on member 5 and the lenses 3 are in position.

In operation when the wearer inhales, the purified air from the chemical or filter cartridge that is connected with tube 19 is drawn into the space between the lenses 3 and the face of the wearer and from this space it passes past valve 20 into the space over the nose and mouth of the wearer that is covered by the inner facepiece 5. There being no closure valve between the inlet to the chemical or filter cartridge and the interior of the outer facepiece of the mask that is outwardly of the inner facepiece, it is apparent that the inner sides of the lenses are at all times in substantial communication with the air outside the mask.

Upon the wearer exhaling, the exhaled air will not enter the space outside the inner facepiece and between said inner facepiece and the inside of the outer facepiece 1, but will immediately be forced out of the exhaust valve into the atmosphere. Thus, at no time does any portion of the exhaled air come in contact with the inner sides of the lenses 3.

Any moisture that would evaporate in the space between lenses 3 and the wearer's face, such as perspiration, would be inhaled upon each inhalation of the wearer, thus keeping the lenses free from contact with air that might otherwise have an excess of moisture over that in the atmosphere sufficient to cause condensation thereof on the inside of the lenses. Since the inner sides of the lenses are in communication at all times with purified atmosphereic air of the same temperature as that of the atmosphere, no fogging or condensation of moisture will occur on the inner sides of the lenses.

No trapping of air that may carry moisture of evaporation from the face in the space covered by the lenses is found to occur under either normal or abnormal conditions, which is due to the fact that there is slightly greater resistance to passage of air through the chemical or filter cartridge than from said space, hence substantially the major part of each charge or quantity of air that fills the space between the lenses and face between each exhalation of the wearer is drawn into the member 5 before a new charge or quantity is drawn through the cartridge, thus any possible difference in the moisture content of the atmospheric air and that within the outer facepiece of the mask is so slight as to be unnoticeable.

The position of the exhaust outlets to the exhaust valve and the position of the inlet (at inner end of sleeve 17) relative to the valved inlet to the inside of inner facepiece 5 are of importance in facilitating the breathing of the wearer. There is the minimum of frictional resistance to passage of air to and from the nostrils or mouth due to this construction, and so long as the chemical or filter cartridge 25 are in the air, the mask is as effective for protecting the wearer under water as in the atmosphere.

In the claims, the designations "outer facepiece" and "inner facepiece" refer to the facepieces as described hereinbefore, and the "inner side" of the outer facepiece and "inner side" of the inner facepiece refer to the spaces within the concave sides of the outer and inner facepieces respectively.

Having described my invention, I claim:

1. In a gas mask of the character described having an inner and an outer, generally concavely shaped facepiece disposed one within the other for separate sealing contact with a wearer's face along their face edges and to respectively cover the nose and mouth area of the face, and substantially the entire face area including the eyes, mouth and nose; eye openings formed in said outer facepiece having lenses fitted therein; a conduit for purified, atmospheric air communicating at one end with an air purifier and at its opposite end with the interior of said outer facepiece for admission of purified, atmospheric air into the space within said outer facepiece and over the sides of said lenses that face into said outer facepiece; an air inlet communicating between the spaces within the outer and inner facepieces; an exhaust air conduit communicating at one end with the interior of said inner facepiece and at its opposite end with the atmosphere outside said outer facepiece; a check valve in said air inlet adapted to admit purified atmospheric air into said inner facepiece from within said outer facepiece only upon inhalation by the wearer and to close said inlet upon exhalation, said exhaust conduit including a check valve adapted to open said conduit to discharge of air from within said inner facepiece upon exhalation of air from within said inner facepiece upon exhalation of air by the wearer and to close said conduit to flow of air therethrough upon inhalation; said exhaust conduit being divided at a point intermediate its length providing a pair to branched passageways respectively opening into said inner facepiece below each of the nostrils of a wearer when the mask is in position on the wearer's face.

2. In a mask of the character described having an outer and an inner face piece separable from each other and respectively adapted to fit over the entire face, and over the nose and mouth of a wearer, an opening formed in said outer face piece provided with a resilient tubular member extending therefrom and integral with said outer face piece, an opening formed in said inner face piece also provided with a resilient tubular member extending therefrom and integral with said inner face piece, an inlet and an exhaust tube in side by side relation extending through said first mentioned member, said outlet tube being filled at one of its ends in said second mentioned member, said second mentioned member extending into said first mentioned member and the latter member being in yieldable embracing engagement with said inlet tube and with the said second mentioned member yieldably holding them together.

3. In a mask of the character described having an outer and an inner face piece separable from each other and respectively adapted to fit over the entire face, and over the nose and mouth of a wearer, an opening formed in said outer face piece provided with a resilient tubular member extending therefrom and integral with said outer face piece, an opening formed in said inner face piece also provided with a resilient tubular member extending therefrom and integral with said inner face piece, an inlet and an exhaust tube in side by side relation extending through said first mentioned member, said outlet tube being filled at one of its ends in said second mentioned member, said second mentioned member extending into said first mentioned member and the latter member being in yieldable embracing engagement with said inlet tube and with the said second mentioned member yieldably holding them together, said inlet tube and said outlet tube being flattened on their adjacent sides to facilitate their fitting alongside each other.

4. In a mask of the character described having an outer and an inner face piece separable from each other and respectively adapted to fit over the entire face, and over the nose and mouth of a wearer, an opening formed in said outer face piece provided with a resilient tubular member extending therefrom and integral with said outer face piece, an opening formed in said inner face piece also provided with a resilient tubular member extending therefrom and integral with said inner face piece, an inlet and an exhaust tube in side by side relation extending through said first mentioned member, said outlet tube being filled at one of its ends in said second mentioned member, said second mentioned member extending into said first mentioned member and the latter member being in yieldably embracing engagement with said inlet tube and with the said second mentioned member yieldably holding them together, said inlet tube and said outlet tube being flattened on their adjacent sides to facilitate their fitting together, and their remaining sides being substantially semi-cylindrical for coacting to define a full cylindrical cross-sectional contour when the flat sides are adjacent each other.

LEO Y. BOOHARIN.